(12) United States Patent
Patel et al.

(10) Patent No.: US 10,614,507 B2
(45) Date of Patent: Apr. 7, 2020

(54) SYSTEMS AND METHODS FOR USING SMART APPLIANCES TO PROVIDE CONTEXTUAL USER EXPERIENCES

(71) Applicant: MasterCard International Incorporated, Purchase, NY (US)

(72) Inventors: Samir Patel, Gujarat (IN); Dhiren Kiritbhai Shah, Gujarat (IN); Paresh Varke, Gujarat (IN); Siddharth Kashyap, Gujarat (IN); Swet Hihoria, Gujarat (IN)

(73) Assignee: Mastercard International Incorporated, Purchase, NY (US)

( * ) Notice: Subject to any disclaimer, the term of this patent is extended or adjusted under 35 U.S.C. 154(b) by 332 days.

(21) Appl. No.: 15/641,214

(22) Filed: Jul. 3, 2017

(65) Prior Publication Data

US 2019/0004488 A1  Jan. 3, 2019

(51) Int. Cl.
| | |
|---|---|
| *G06Q 30/06* | (2012.01) |
| *G05B 19/042* | (2006.01) |
| *G06Q 10/08* | (2012.01) |
| *G06Q 20/20* | (2012.01) |
| *G05B 19/05* | (2006.01) |

(52) U.S. Cl.
CPC ....... *G06Q 30/0633* (2013.01); *G05B 19/042* (2013.01); *G05B 19/05* (2013.01); *G06Q 10/087* (2013.01); *G06Q 20/208* (2013.01); *G06Q 30/0601* (2013.01); *G06Q 30/0631* (2013.01); *G06Q 30/0641* (2013.01); *G05B 2219/23027* (2013.01); *G05B 2219/2654* (2013.01)

(58) Field of Classification Search
CPC ............ G06Q 30/0641; G06Q 10/087; G06Q 20/208; G05B 19/05; G05B 19/042; G05B 2219/2654; G05B 2219/23027
USPC .................................. 705/27.1, 26.8, 14.66
See application file for complete search history.

(56) References Cited

U.S. PATENT DOCUMENTS

| | | | |
|---|---|---|---|
| 8,533,144 B1 * | 9/2013 | Reeser ................... | G06Q 30/02 705/14.53 |
| 10,360,617 B2 * | 7/2019 | High .................. | G06Q 30/0635 |
| 10,362,118 B2 * | 7/2019 | Grossman, IV ...... | H04L 67/125 |

(Continued)

OTHER PUBLICATIONS 2017-105582, Feb. 2017, Derwent, Cha S.*
Unknown, "Neo—Smart Jar", captured Jul. 3, 2017, https://www.indiegogo.com/projects/neo-smart-jar#/, 27 pages.

*Primary Examiner* — Yogesh C Garg

(57) ABSTRACT

Embodiments of the disclosure enable contextual user experiences to be provided. A computing system receives sensor data from an appliance associated with a first user account, and analyzes the sensor data to identify a product and one or more second user accounts associated with the product. The second user accounts are used to aggregate product data associated with the product, and the product data is used to generate catalog data associated with the product. The catalog data includes one or more portions associated with the second user accounts and is transmitted to a client device associated with the first user account to prompt a first user to enter into a transaction associated with the product. Each portion of the catalog data is selectable to facilitate the transaction between the first user and a respective second user associated with the second user accounts.

20 Claims, 7 Drawing Sheets

(56) References Cited

U.S. PATENT DOCUMENTS

| | | | |
|---|---|---|---|
| 2012/0226764 A1* | 9/2012 | Philip | H04L 67/025 709/208 |
| 2013/0223279 A1* | 8/2013 | Tinnakornsrisuphap | H04L 41/0809 370/254 |
| 2013/0245849 A1* | 9/2013 | Paul | H02J 3/14 700/295 |
| 2015/0149298 A1* | 5/2015 | Tapley | G06Q 30/0633 705/14.66 |
| 2015/0302510 A1* | 10/2015 | Godsey | G06Q 10/087 705/26.81 |
| 2017/0308909 A1* | 10/2017 | Faith | G06Q 30/0201 |
| 2017/0344982 A1* | 11/2017 | Kim | G06Q 10/083 |
| 2018/0165748 A1* | 6/2018 | Hosny | G06Q 30/0282 |

* cited by examiner

SYSTEMS AND METHODS FOR USING SMART APPLIANCES TO PROVIDE CONTEXTUAL USER EXPERIENCES

FIELD OF THE DISCLOSURE

The subject matter described herein relates generally to information processing and, more specifically, to systems and methods for using a smart appliance to provide a user with a contextual user experience.

BACKGROUND

Appliances perform certain operations that help its users accomplish desired tasks. For example, a user may use an appliance that transfers heat from an interior cavity to an exterior environment (e.g., a refrigerator) to store food in a relatively cool setting. Some known appliances include and/or use a communication system that transmits and/or receives information. Information may be used, for example, to augment or enhance a user experience with the appliance.

Some known communication systems enable the appliance to be remotely monitored. At least some information provided to the user, however, may not be immediately actionable and, in some instances, increases user anxiety and/or frustration. For example, the user may receive a notification that a refrigerator door is ajar with no option but to manually close the refrigerator door. Additionally, some known communication systems enable the appliance to stream media (e.g., music, news, television shows, movies). Such and other like uses of the communication system, however, are not directly related to the operations and/or tasks associated with the appliance and, thus, do not provide a contextual user experience.

SUMMARY

Embodiments of the disclosure enable a computing system to provide a contextual user experience. The computing system includes a memory device storing data associated with a plurality of accounts and computer-executable instructions, and a processor. The processor executes the computer-executable instructions to receive, from a sensor device, sensor data associated with an appliance that is associated with a first user account. The sensor data is analyzed to identify a first product, and one or more second user accounts that are associated with the identified first product are identified. The second user accounts are used to aggregate primary product data associated with the first product and, based on the aggregated primary product data, primary catalog data associated with the first product is generated. The primary catalog data includes one or more portions associated with the second user accounts. Presentation data, including the primary catalog data, is transmitted to a client device associated with the first user account to prompt a first user associated with the first user account to enter into a transaction associated with the first product. Each portion of the primary catalog data is selectable to facilitate the transaction between the first user and a respective second user associated with the second user accounts.

In another aspect, one or more computer storage media embodied with computer-executable instructions are provided. The computer storage media includes a management component, a catalog component, and a transaction component. The management component obtains sensor data associated with an appliance that is associated with a first user, and analyzes the sensor data to identify a first product. The catalog component aggregates primary product data associated with the first product, and uses the primary product data to generate primary catalog data that includes one or more portions corresponding to one or more second users associated with the first product. The transaction component prompts the first user to select a portion of the portions for entering into a transaction associated with the first product with a corresponding second user.

In yet another aspect, a computer-implemented method is provided for providing a contextual user experience. The computer-implemented method includes receiving, from a sensor device, sensor data associated with an appliance. The appliance is associated with a first user account that is associated with a first user. Based on the sensor data, a first product is identified, and primary product data associated with the first product is aggregated. Based on the aggregated primary product data, primary catalog data associated with the first product is generated. The primary catalog data includes one or more portions associated with one or more second user accounts. Presentation data, including the primary catalog data, is transmitted, to a client device associated with the first user account, to prompt the first user to enter into a transaction associated with the first product. Each portion of the primary catalog data is selectable to facilitate the transaction between the first user and a respective second user associated with the second user accounts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
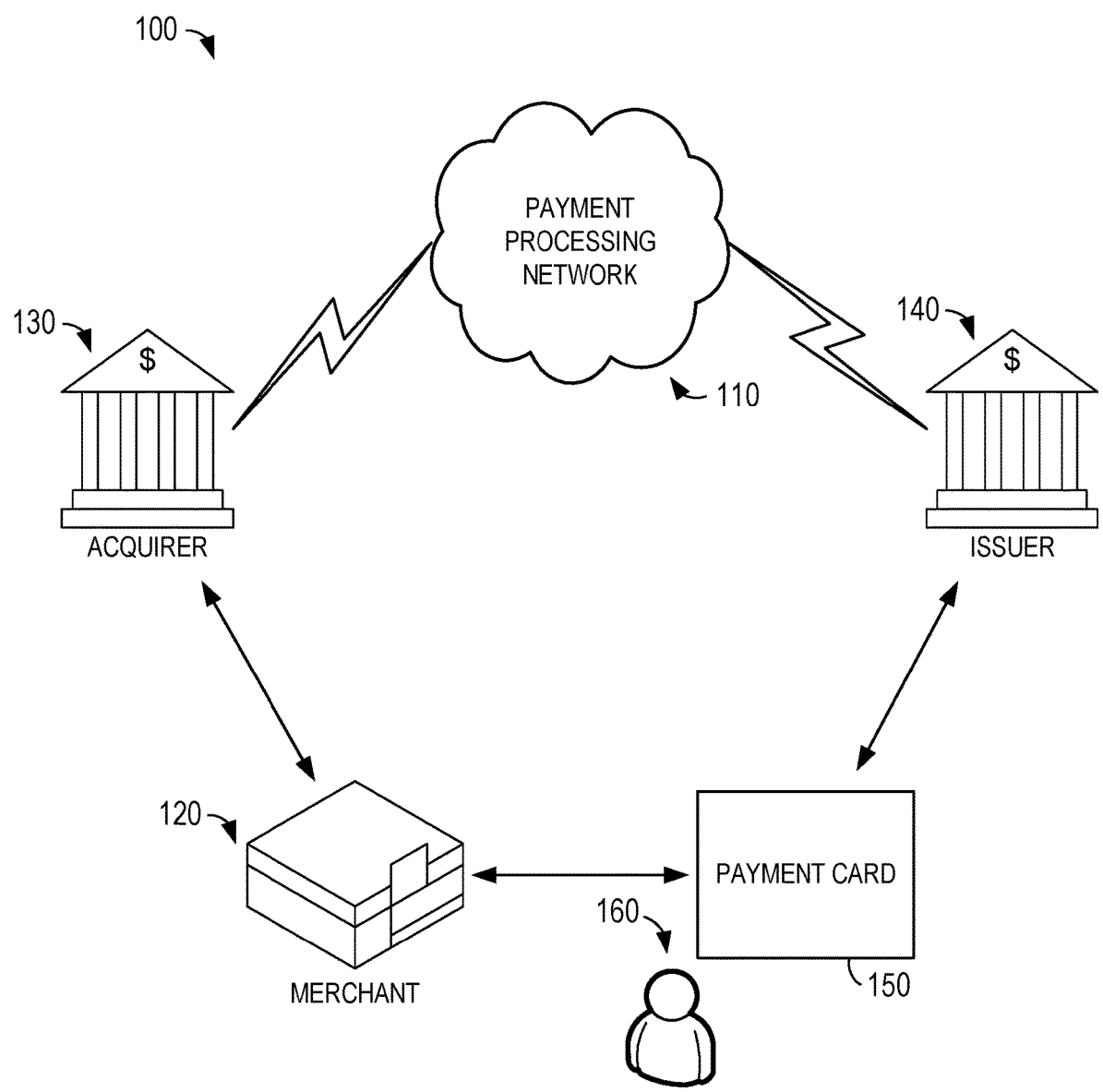
FIG. 1 is a block diagram illustrating an example environment for processing financial transactions.

The subject matter described herein relates to using one or more smart appliances to provide contextual user experiences. Embodiments of the disclosure enable one or more opportunities for enhancing a financial transaction to be identified. For example, a cardholder may be allowed to select a product from one of a plurality of merchants, and the merchant associated with the product may be provided with an opportunity to provide the cardholder with a contextual offer. The contextual offer may be identified, for example, based on sensor data associated with the smart appliances, product data associated with the products, and product data associated with the available contextual offers. In this manner, a contextual offer that is tailored to the consumer may be identified from the available contextual offers in a constructive, complementary, and/or effective manner.

The embodiments described herein aggregate primary product data associated with a plurality of products from a plurality of merchants. Aggregating data from a plurality of merchants enables the embodiments described herein to provide the cardholder with opportunities to efficiently compare products from a variety of merchants and make an informed decision on one or more financial transactions. Additionally, the embodiments described herein may provide a merchant with information associated with the cardholder to enable the merchant to efficiently and effectively identify one or more contextual offers for the cardholder.

While no personally identifiable information is tracked by the embodiments described herein, the embodiments have been described with reference to data being monitored and/or collected from one or more users, including cardholders and merchants. The data may be monitored and/or collected in accordance with applicable data privacy laws and regulations. For example, a user may be provided with notice of the data being monitored and/or collected (e.g., via a dialog box or preference setting), and/or the user may be given the opportunity to give or deny consent for the monitoring and/or collection of the data. The consent may take the form of opt-in consent or opt-out consent.

Aspects of the disclosure provide for a computing system that performs one or more operations in an environment including a plurality of devices coupled to each other via a network (e.g., a local area network (LAN), a wide area network (WAN), the Internet). For example, a system server may communicate with one or more appliances, user devices, and/or merchant devices to identify and/or obtain sensor data associated with an appliance, account data associated with a consumer, and/or product data associated with a merchant. In this manner, data associated with a contextual offer may be efficiently obtained from a plurality of data sources, and the data may be timely used to enhance a financial transaction.

The systems and processes described herein may be implemented using computer programming or engineering techniques including computer software, firmware, hardware or a combination or subset thereof. At least one technical problem with known computing systems is that, with the sheer magnitude of data available or accessible to a computing system, it can be difficult, time-consuming, and/or onerous to aggregate data from a plurality of sources and/or identify data of interest. The embodiments described herein address at least these technical problems.

By processing financial transactions in the manner described in this disclosure, some embodiments improve user experience, user efficiency, user interaction performance, and/or communication between systems by using a central system server to communicate with one or more other computing systems to use sensor data associated with one or more appliances, account data associated with one or more consumers, and/or product data associated with one or more merchants. Additionally, some embodiments may reduce processor load by reducing an amount of data to be analyzed or processed, reduce network bandwidth usage by reducing an amount of data to be transmitted, improve processor security and/or data transmission security by managing access to various accounts, and/or reduce error rate by automating the analysis and processing of financial transactions.

The technical effect of the systems and processes described herein is achieved by performing at least one of the following operations: a) receive registration data associated with a plurality of products, correlates an appliance with a product, establishes a threshold associated with the appliance and/or product, and allows a user to enter into a financial transaction associated with the product; b) receive first sensor data associated with the appliance; c) analyze the first sensor data to identify the product associated with the appliance; d) determine a status of the product; e) generate recommendation data associated with the product; f) identify one or more merchant accounts associated with the product; g) aggregate primary product data associated with the product from one or more merchant accounts; h) generate primary catalog data associated with the product; i) transmit primary catalog data to prompt the user to selectively enter into a transaction with a merchant; j) receive location data associated with the user; k) transmit a request for contextual offers; l) receive a contextual offer; m) generate secondary catalog data associated with the contextual offer; n) transmit secondary catalog data to prompt the user to selectively enter into a transaction with the merchant; o) receive second sensor data associated with a merchant appliance; p) analyze the second sensor data to identify a product associated with the merchant appliance; and/or q) use the second sensor data to manage primary product data associated with the product.

FIG. 1 is a block diagram illustrating an example environment 100 for processing one or more financial transactions. The environment 100 includes a processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide one or more payment cards 150 to one or more cardholders 160 or, more broadly, account holders ("cardholder" and "account holder" may be used interchangeably herein). An issuer 140 is a financial institution that maintains a relationship with a cardholder 160 to enable the cardholder 160 to make a payment using a payment card 150 via the processing network 110. As described herein, the term "payment card" includes credit cards, debit cards, prepaid cards, key fobs, digital cards, smart cards, and any other payment product that is linked or associated with a corresponding cardholder account maintained by the issuer 140.

The cardholder 160 may use the payment card 150 to enter into one or more financial transactions with one or more merchants 120. The payment card 150 may have any shape, size, or configuration that enables the cardholder 160 to make a payment to a merchant 120 using a cardholder account. For example, account information stored in a microchip or magnetic stripe on the payment card 150 may be used to identify a cardholder account associated with the payment card 150. In some embodiments, the payment card 150 uses mobile payment technology and/or contactless payment technology to facilitate communication between the cardholder 160 and the merchant 120. For example, the payment card 150 may include or be associated with a radio frequency identification (RFID)-enabled device, a BLUETOOTH® brand wireless technology-enabled device, a WI-FI® brand local area wireless computing network-enabled device, and/or a near field communication (NFC) wireless communication-enabled device. (BLUETOOTH® is a registered trademark of Bluetooth Special Interest Group, and WI-FI® is a registered trademark of the Wi-Fi Alliance).

In some embodiments, the cardholder 160 presents the merchant 120 with the payment card 150 to make a payment to the merchant 120 using the cardholder account in exchange for the good or service. Alternatively, the cardholder 160 may provide the merchant 120 with account information associated with the payment card 150 without physically presenting the payment card 150 to the merchant 120 (e.g., for remote financial transactions, including e-commerce transactions, card-not-present transactions, or card-on-file transactions). Account information may include, for example, a name of the cardholder 160, an account number, an expiration date, and/or a security code (e.g., a card verification value (CVV), a card verification code (CVC), a personal identification number (PIN)).

The merchant 120 requests authorization from an acquirer 130 for at least the amount of the purchase. The merchant 120 may request authorization using any financial transaction computing device configured to transmit account information of the cardholder 160 to one or more financial transaction processing computing devices of the acquirer 130. For example, the merchant 120 may use a point-of-sale (POS) terminal that reads account information from the microchip or magnetic stripe on the payment card 150 and transmits the account information to a financial transaction processing computing device of the acquirer 130. Additionally or alternatively, the POS terminal may receive the account information from a communication device using mobile payment technology and/or contactless payment technology, and transmit the account information to the financial transaction processing computing device of the acquirer 130.

Using the processing network 110, the financial transaction processing computing device of the acquirer 130 communicates with one or more financial transaction processing computing devices of an issuer 140 to determine whether the account information of the cardholder 160 matches or corresponds to the account information of the issuer 140, whether the cardholder account is in good standing, and/or whether the purchase is covered by an available credit line or account balance associated with the cardholder account (e.g., a purchase amount is less than an account capacity). Based on these determinations, a financial transaction processing computing device of the issuer 140 determines whether to approve or decline the request for authorization from the merchant 120.

If the request for authorization is declined, the merchant 120 is notified (e.g., via the processing network 110) as such, and may request authorization from the acquirer 130 for a lesser amount or request an alternative form of payment (e.g., cash, another payment card 150) from the cardholder 160. If the request for authorization is approved, an authorization code is issued (e.g., via the processing network 110) to the merchant 120, and the available credit line or account balance associated with the cardholder account is decreased by at least the amount of the purchase. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer for reimbursing the merchant 120. When a credit card is used, the issuer 140 may bill the cardholder 160 to settle the cardholder account (e.g., a credit card account) with the cardholder 160. When a debit or prepaid card is used, the issuer 140 may automatically withdraw funds from the cardholder account (e.g., a checking account, a savings account) to settle the cardholder account.

Figure 2:
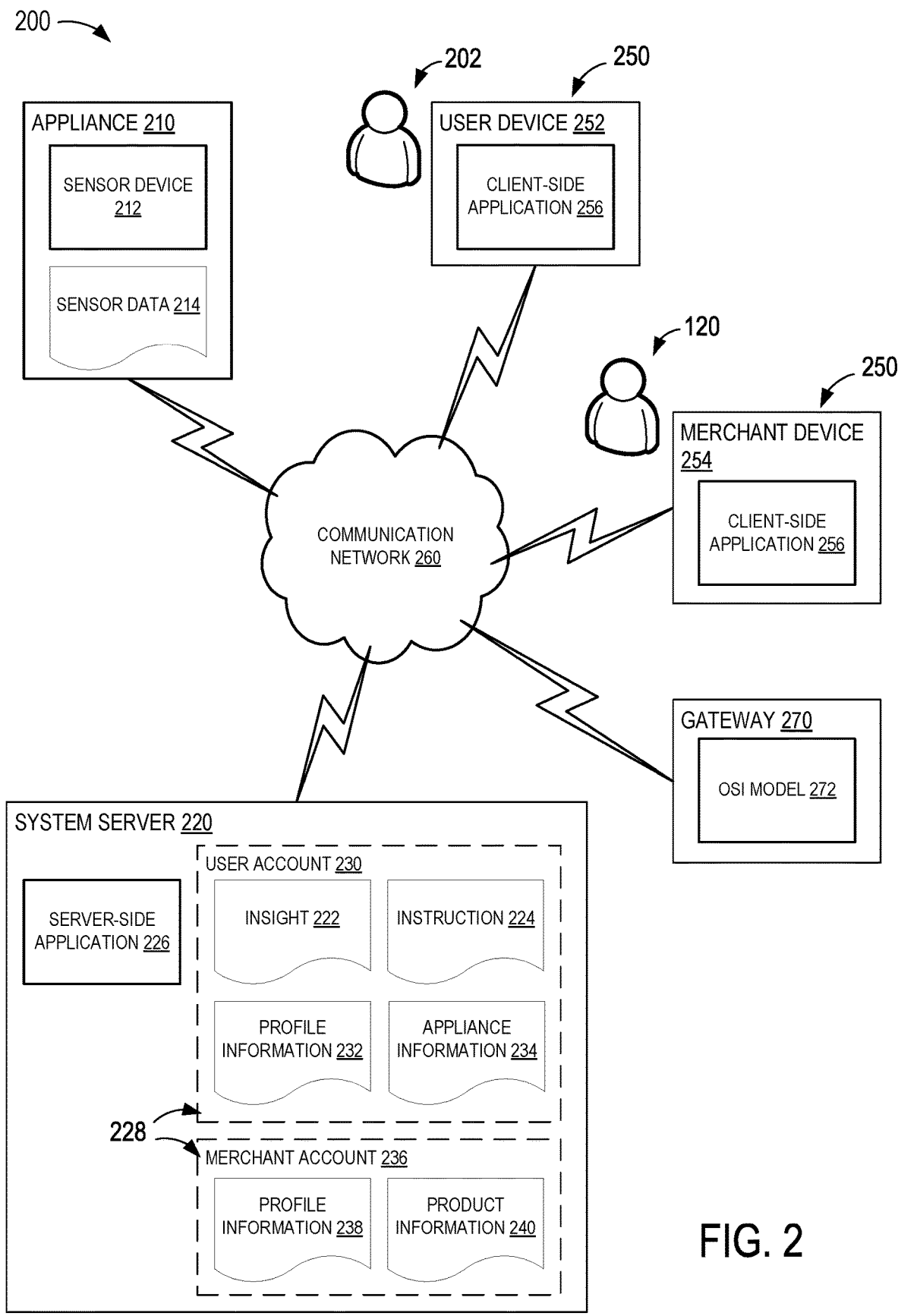
FIG. 2 is a block diagram illustrating an example ecosystem for providing contextual user experiences in an environment, such as the environment shown in FIG. 1.

FIG. 2 is a block diagram illustrating an example ecosystem 200 for providing one or more first users or consumers 202 (e.g., cardholder 160) with one or more contextual user experiences. The ecosystem 200 may be, for example, an Internet of Things (IoT) ecosystem that includes one or more appliances 210. The appliances 210 are configured to perform one or more operations that help its user (e.g., user 202) accomplish one or more desired tasks. The appliances 210 may include physical and/or virtual components. Example appliances 210 include a household appliance, a consumer electronic device, a monitoring device, an intelligent agent, a smart device, and the like.

An appliance 210 includes one or more input devices or sensor devices 212 that generate sensor data 214. Sensor data 214 may be used, for example, to monitor one or more predetermined attributes associated with the appliance 210 and/or its environment. Example sensor devices 212 include a machine vision sensor, an imaging sensor, an infrared sensor, an optical sensor, an ambient light sensor, an accelerometer, a gyroscope, a velocity sensor, a sound sensor, an acoustic sensor, an ultrasonic sensor, an electric sensor, a magnetometer, an NFC sensor, an RFID sensor, a global positioning system (GPS) sensor, a position sensor, a motion detector, a presence sensor, a proximity sensor, a touch sensor, a force sensor, a load sensor, a pressure sensor, a torque sensor, a strain sensor, a flow sensor, a displacement sensor, a thermometer, a barometer, a humidity sensor, a moisture sensor, a leak sensor, a level sensor, a chemical sensor, a gas sensor, and the like.

In some embodiments, a sensor device 212 is, includes or is associated with a user interface that receives user input from one or more users of the appliance 210 (e.g., consumer 202). The user input may be used, for example, to generate at least a portion of the sensor data 214. Example user interfaces include a hardware interface, a graphical user interface, a motion tracking interface, a non-command user interface (e.g., inferences based on user observation used as input), a zero-input interface (e.g., sensor data used as input), and the like. The sensor devices 212 may be internal to the appliance 210 (as shown in FIG. 2), external to the appliance 210, or both.

The ecosystem 200 includes a system server 220 that controls or manages one or more aspects of the ecosystem 200. In some embodiments, the system server 220 communicates with one or more appliances 210 to aggregate or collect sensor data 214, and analyzes the sensor data 214 to identify one or more insights 222 associated with the consumers 202. The insights 222 may be used, for example, to identify one or more opportunities to provide a consumer 202 with a contextual user experience and/or to increase an effectiveness and/or efficiency of the ecosystem 200. In some embodiments, the system server 220 uses the insights 222 to generate one or more instructions 224, and transmits the instructions 224 to one or more appliances 210 to enable the appliances 210 to perform one or more operations in accordance with the instructions 224. The system server 220 may include, for example, one or more server-side applications 226 that enable one or more services to be provided at one or more computing systems (e.g., appliance 210) in the ecosystem 200.

The system server 220 stores and/or maintains one or more accounts 228 associated with one or more users. The accounts 228 include one or more user accounts 230 associated with one or more consumers 202 ("first user accounts"). A user account 230 may include, for example, sensor data 214, insights 222, instructions 224, profile information 232 associated with a consumer 202, and appliance information 234 associated with one or more appliances 210. At least a portion of the profile information 232 and/or appliance information 234 may be generated, for example, based on sensor data 214 and/or one or more insights 222. Example profile information 232 includes user identifier data, preference data, usage data, consumption data, contextual data, and the like. Example appliance information 234 includes appliance identifier data, classification data, configuration data, usage data, consumption data, contextual data, and the like.

In some embodiments, the accounts 228 include one or more merchant accounts 236 associated with one or more merchants 120 ("second user accounts"). A merchant account 236 may include, for example, profile information 238 associated with a merchant 120, and product information 240 associated with one or more products (e.g., goods, services). Example profile information 238 includes user identifier data, preference data, usage data, consumption data, contextual data, and the like. Example product information 240 includes product identifier data, classification data, inventory data, quantity data, size data, price data, and the like.

The ecosystem 200 may include one or more client devices 250 that allow a user of the client device 250 to communicate with one or more computing systems in the ecosystem 200 (e.g., appliance 210, system server 220). In some embodiments, the client devices 250 include one or more user devices 252 associated with one or more consumers 202, and/or one or more merchant devices 254 associated with one or more merchants 120. For example, a consumer 202 may use a user device 252 to access and/or use a user account 230 for remotely monitoring and/or operating the appliance 210, and a merchant 120 may use a merchant device 254 to access and/or use a merchant account 236 for generating and/or modifying product information 240. In some embodiments, the client devices 250 include one or more client-side applications 256 that perform one or more operations at the client device 250 while one or more operations are performed on the backend at the system server 220.

The ecosystem 200 includes one or more communication networks 260 that enable information to be communicated between a plurality of computing systems coupled to the communication networks 260 (e.g., appliance 210, system server 220, client device 250). Example communication networks 260 include a cellular or mobile network and the Internet. Alternatively, the communication networks 260 may include any communication medium that enables the ecosystem 200 to function as described herein including, for example, a personal area network (PAN), a LAN, and/or a WAN.

The ecosystem 200 may include one or more gateways 270 that facilitate communication within the ecosystem 200. The gateways 270 may identify and/or locate one or more computing systems (e.g., appliance 210, system server 220, client device 250) to selectively route data in and/or through the ecosystem 200. In some embodiments, the gateways 270 format data and/or control data exchange using an Open Systems Interconnection (OSI) model 272 that enables the computing systems to communicate with one or more other computing systems using one or more communication protocols. Example communication protocols include a WI-FI® brand communication protocol, a BLUETOOTH® brand communication protocol, a ZIGBEE® brand communication protocol, a Z-WAVE™ brand communication protocol, an Internet Protocol (IP) communication protocol, an NFC communication protocol, an RFID communication protocol, a cellular communication protocol, and the like. (ZIGBEE® is a registered trademark of ZigBee Alliance Corporation, and Z-WAVE™ is a trademark of Sigma Designs, Inc.).

Figure 3:
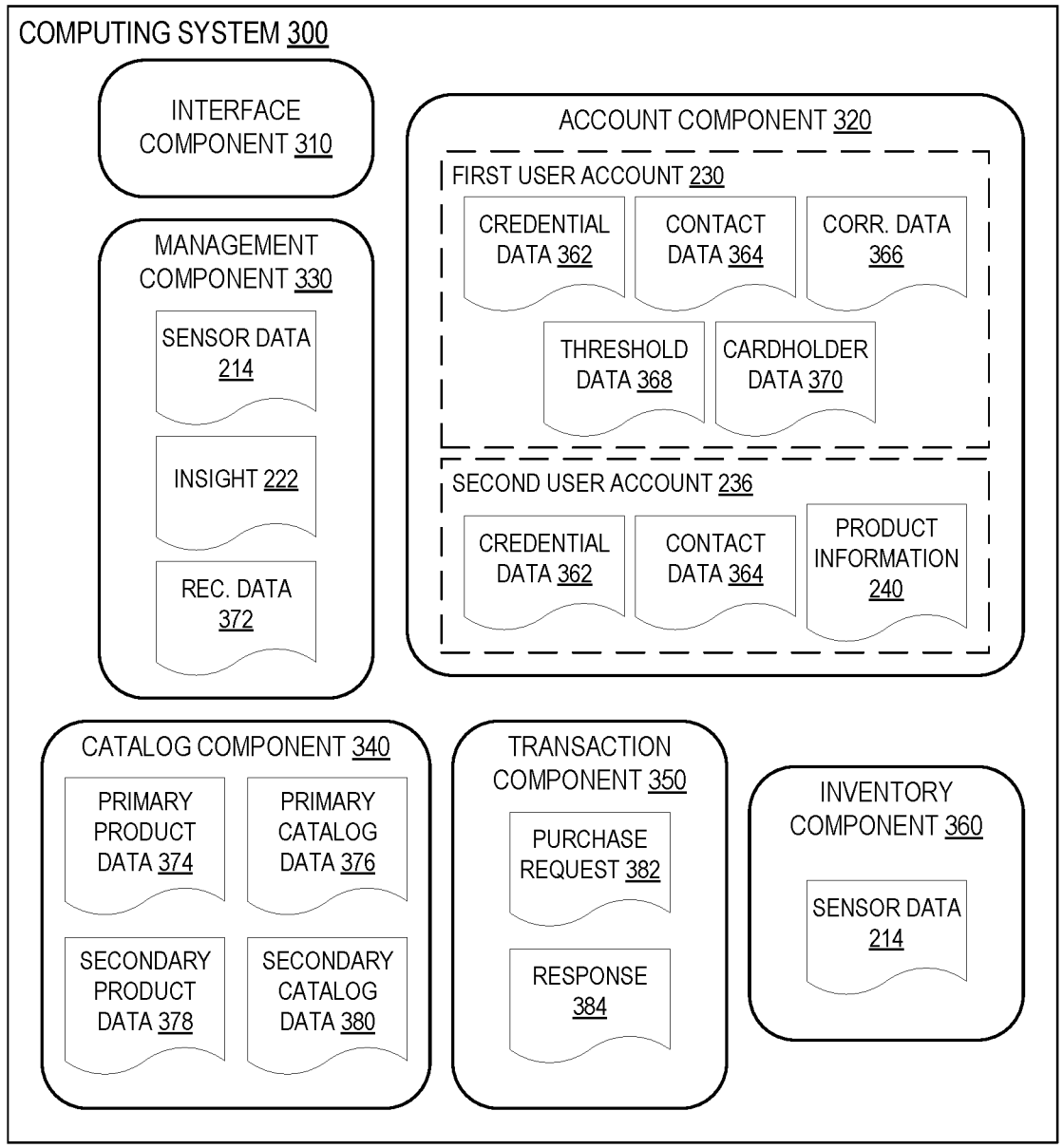
FIG. 3 is a block diagram illustrating an example computing system for providing contextual user experiences in an ecosystem, such as the ecosystem shown in FIG. 2.

FIG. 3 is a block diagram illustrating a computing system 300 (e.g., system server 220) that may be used to provide contextual user experiences in the ecosystem 200. The computing system 300 includes an interface component 310, an account component 320, a management component 330, a catalog component 340, a transaction component 350, and/or an inventory component 360. In some embodiments, the interface component 310 enables the computing system 300 to receive data from and/or transmit data to one or more other computing systems (e.g., appliance 210, client device 250). For example, the interface component 310 may be coupled to another computing system to facilitate communication between the other computing system and the account component 320, management component 330, catalog component 340, transaction component 350, and/or inventory component 360. In some embodiments, the interface component 310 facilitates communication between and among the account component 320, management component 330, catalog component 340, transaction component 350, and/or inventory component 360. The interface component 310 may be, include, or be associated with one or more gateways 270.

The account component 320 enables the computing system 300 to manage data associated with one or more accounts 228 (e.g., user account 230, merchant account 236). The account component 320 may include or be associated with credential data 362 that enables the computing system 300 to identify and/or authenticate an entity (e.g., merchant 120, consumer 202, appliance 210, client device 250) and/or contact data 364 that enables the computing system 300 to locate and/or approach the entity for communicating (e.g., via the interface component 310) with the entity.

In some embodiments, the account component 320 uses credential data 362 to selectively allow one or more users to access and use account data associated with an account 228. For example, credential data 362 associated with a user account 230 may be used to authenticate a consumer 202 as an authorized user of the user account 230. For another example, credential data 362 associated with a merchant account 236 may be used to authenticate a merchant 120 as an authorized user of the merchant account 236. Example credential data 362 includes an account number, a username, a PIN, a password, a public key infrastructure (PKI) certificate, a token, biometric data, and the like.

In some embodiments, the account component 320 uses contact data 364 to communicate with one or more other computing systems (e.g., appliance 210, client device 250).

For example, contact data 364 associated with a user account 230 may be used to establish a communication link with a user device 252 for communicating with a user of the user device 252 (e.g., consumer 202). For another example, contact data 364 associated with a merchant account 236 may be used to establish a communication link with a merchant device 254 for communicating with a user of the merchant device 254 (e.g., merchant 120). Example contact data 364 includes an address, a telephone number, a BLUETOOTH® brand wireless technology identifier, a routing number, an Internet Protocol (IP) address, a media access controller (MAC) address, an NFC identifier, an RFID identifier, and the like.

The account component 320 is configured to process one or more registration requests to register data ("registration data") with the computing system 300. A registration request may be processed, for example, to associate data (e.g., credential data 362, contact data 364) with an account 228. Data may be registered with the computing system 300 such that the interface component 310, account component 320, management component 330, catalog component 340, transaction component 350, and/or inventory component 360 may access and/or use the registered data in an efficient manner.

A merchant 120 may register product information 240, for example, with the computing system 300 such that the product information 240 is associated with the merchant account 236. Additionally or alternatively, a consumer 202 may register correlation data 366, threshold data 368, and/or cardholder data 370 with the computing system 300 such that the correlation data 366, threshold data 368, and/or cardholder data 370 are associated with the user account 230. The correlation data 366 correlates one or more appliances 210 with one or more products, and the threshold data 368 establishes one or more thresholds associated with the appliances 210 and/or products. The correlation data 366 may indicate, for example, that an appliance 210 is being used to store a product, and the threshold data 368 may be used to identify one or more triggering events or conditions. The cardholder data 370 is usable (e.g., by a user associated with the user account 230) to enter into or more financial transactions. The cardholder data 370 may be or include, for example, account information associated with a payment card 150.

The management component 330 enables the computing system 300 to monitor one or more appliances 210 and/or one or products associated with the appliances. In some embodiments, the management component 330 obtains sensor data 214 associated with an appliance 210, and analyzes the sensor data 214 to identify a product associated with the appliance 210. A product may be identified, for example, using correlation data 366 associated with the appliance 210. In some embodiments, the product is directly correlated to the appliance 210 (e.g., the product is stored in the appliance 210). Alternatively, the product may be indirectly correlated to the appliance 210. For example, a first product may be associated with a second product that is directly correlated to the appliance 210, and the first product may be identified based on a relationship between the first product and the second product.

The management component 330 is configured to analyze sensor data 214 and/or historical data (e.g., past sensor data 214, past insights 222) to identify one or more insights 222. In some embodiments, the management component 330 identifies or determines a status of a product based on sensor data 214 and/or historical data. The management component 330 may identify, for example, one or more quantity levels (e.g., amounts) associated with one or more products, and compare the quantity levels with one or more predetermined thresholds using the threshold data 368 to identify one or more statuses associated with the products. In some embodiments, the management component 330 compares a quantity level with one or more predetermined thresholds to determine whether the identified quantity level satisfies the predetermined thresholds.

If the quantity level is above a predetermined alert range, for example, the corresponding product may be categorized as having a lower risk of depletion (e.g., the appliance 210 is storing a relatively large amount of the product). If the quantity level is within the predetermined alert range, the corresponding product may be categorized as being a medium risk of depletion (e.g., the appliance 210 is storing a relatively moderate amount of the product such that the risk of depletion within a predetermined timeframe is relatively low). If the quantity level is below the predetermined alert range, the corresponding product may be categorized as having a higher risk of depletion (e.g., the appliance 210 is storing a relatively small amount of the product, if not no product).

In some embodiments, the management component 330 uses the insights 222 to generate recommendation data 372. For example, the management component 330 may recommend not replenishing the product if the product is categorized as having a lower risk of depletion. For another example, the management component 330 may recommend at least considering replenishing the product if the product is categorized as having a medium risk of depletion. In some embodiments, the management component 330 automatically arranges or schedules a financial transaction that enables a product categorized as having a medium risk of depletion to be replenished. The product may be placed, for example, in a virtual shopping cart that enables the product to be replenished with a subsequent conversion of one or more products associated with the shopping cart. In this manner, the consumer 202 may opt-out of the conversion by removing the product from the shopping cart. For yet another example, the management component 330 may recommend replenishing the product, at least within a predetermined timeframe, if the product is categorized as having a higher risk of depletion. In some embodiments, the management component 330 automatically enters into a financial transaction that enables a product categorized as having a higher risk of depletion to be replenished.

In addition to generating a recommendation on whether a product is replenished, the management component 330 may recommend a purchase quantity. In some embodiments, the management component 330 recommends a purchase quantity using current data. For example, the management component 330 may identify a difference between a current quantity (e.g., based on sensor data 214) and a predetermined replenished quantity (e.g., based on threshold data 368), and recommend a purchase quantity based on the difference. For another example, the management component 330 may recommend a purchase quantity based on price data. If a current price is relatively high, the management component 330 may recommend waiting for a price decrease before purchasing the product or purchasing a relatively small quantity that enables the consumer 202 to wait for a potential price decrease. Conversely, if the current price is relatively low, the management component 330 may recommend purchasing the product or purchasing a relatively large quantity of the product that allows the consumers 202 to delay a subsequent purchase of the product.

Additionally, the management component 330 may recommend the purchase quantity using historical data (e.g., previous sensor data 214, previous insights 222, previous recommendation data 372, previous purchase quantities, previous purchase prices, previous purchase dates) and/or one or more insights 222, which may be identified using current data and/or historical data. Insights 222 may be used, for example, to identify one or more patterns that are usable to recommend the purchase quantity (e.g., a purchasing pattern of the consumer 202, a consumption pattern of the consumer 202, a supply pattern of the product, a demand pattern of the product).

At least some recommendation data 372 may be generated using projection data. In some embodiments, the management component 330 generates projection data using known information (e.g., data associated with an upcoming sale or promotion) and/or information inferred based on historical data, current data, and/or one or more insights 222. A purchase quantity may be recommended, for example, based on a projected price adjustment, a projected date of the price adjustment, a projected purchase of the consumer 202, a projected consumption of the consumer 202, a projected supply of the product (e.g., merchant inventory), and/or a projected demand of the product.

The catalog component 340 enables the computing system 300 to generate a menu or catalog associated with one or more products. The catalog component 340 is configured to aggregate or collect primary product data 374 associated with one or more products (e.g., product information 240), and use the primary product data 374 to generate primary catalog data 376 associated with the products. In some embodiments, the catalog component 340 collects primary product data 374 from a plurality of sources (e.g., merchants 120). Primary product data 374 may be collected, for example, for each product in a set of products. In some embodiments, the catalog component 340 identifies one or more products to include in the set of products based on one or more appliances 210 identified using sensor data 214 and/or correlation data 366. The primary catalog data 376 may include one or more product portions, wherein each product portion corresponds to a respective product. Additionally or alternatively, if the primary product data 374 is associated with one or more merchants 120, the primary catalog data 376 may include one or more merchant portions, wherein each merchant portion corresponds to a respective merchant 120.

In some embodiments, the catalog component 340 obtains secondary product data 378 associated with one or more contextual offers, and uses the secondary product data 378 to generate secondary catalog data 380 associated with the contextual offers. The contextual offers may be associated with a first product associated with the appliance 210 and/or a second product associated with the first product. That is, in some embodiments, the catalog component 340 may obtain one or more contextual offers associated with one or more products that are not monitored by the ecosystem 200.

The contextual offers may be identified based on a projected value add for the consumer 202 (e.g., a value of the contextual user experience). In some embodiments, the catalog component 340 allows the merchant 120 to access and/or use product information 240 associated with the first product and/or account data associated with the user account 230 (e.g., profile information 232) to facilitate increasing the value of the contextual user experience. Additionally or alternatively, the catalog component 340 may generate one or more contextual offers to facilitate increasing the value of the contextual user experience.

The secondary catalog data 380 may include one or more product portions, wherein each product portion corresponds to a respective contextual offer. Additionally or alternatively, if the secondary product data 378 is associated with one or more merchants 120, the secondary catalog data 380 may include one or more merchant portions, wherein each merchant portion corresponds to a respective merchant 120.

The transaction component 350 enables the computing system 300 to facilitate one or more financial transactions. The transaction component 350 is configured to prompt the consumer 202 to select or identify one or more products for entering into one or more financial transactions associated with the identified products. In some embodiments, the transaction component 350 prompts the consumer 202 to select or identify one or more merchants 120 for entering into one or more financial transactions associated with the identified merchants 120. The consumer 202 may select, for example, one or more portions of the primary catalog data 376 corresponding to a desired product and/or a desired merchant 120. Additionally or alternatively, the consumer 202 may select one or more portions of the secondary catalog data 380 corresponding to a desired contextual offer and/or a desired merchant 120.

The transaction component 350 is configured to generate one or more purchase requests 382 associated with one or more products and/or contextual offers. The purchase request 382 may be generated, for example, using cardholder data 370. In some embodiments, the transaction component 350 communicates (e.g., via the interface component 310) with a merchant device 254 (e.g., a POS terminal) to provide a purchase request 382 to the merchant device 254 for entering into one or more financial transactions with a merchant 120 associated with the merchant device 254, and obtain a response 384 to the purchase request from the merchant device 254. Additionally or alternatively, the transaction component 350 may communicate (e.g., via the interface component 310) with a financial transaction computing device of the issuer 140 (e.g., a POS terminal) to provide a request for authorization of a financial transaction to the financial transaction computing device, and obtain a response to the request for authorization from the financial transaction computing device.

The inventory component 360 enables the computing system 300 to manage product information 240 associated with one or more products. At least a portion of the product information 240, for example, may be modified based on one or more financial transactions. In some embodiments, the inventory component 360 communicates (e.g., via the interface component 310) with one or more appliances 210 that are associated with one or more merchants 120 ("merchant appliances") to obtain sensor data 214 associated with the merchant appliances ("second sensor data") for managing the product information 240. The second sensor data may be used, for example, to generate and/or modify at least a portion of the primary product data 374 and/or secondary product data 378. In some embodiments, the inventory component 360 communicates (e.g., via the interface component 310) with the management component 330 to analyze the second sensor data, identify one or more insights 222 associated with the merchants 120, and/or generate recommendation data 372.

Figure 4:
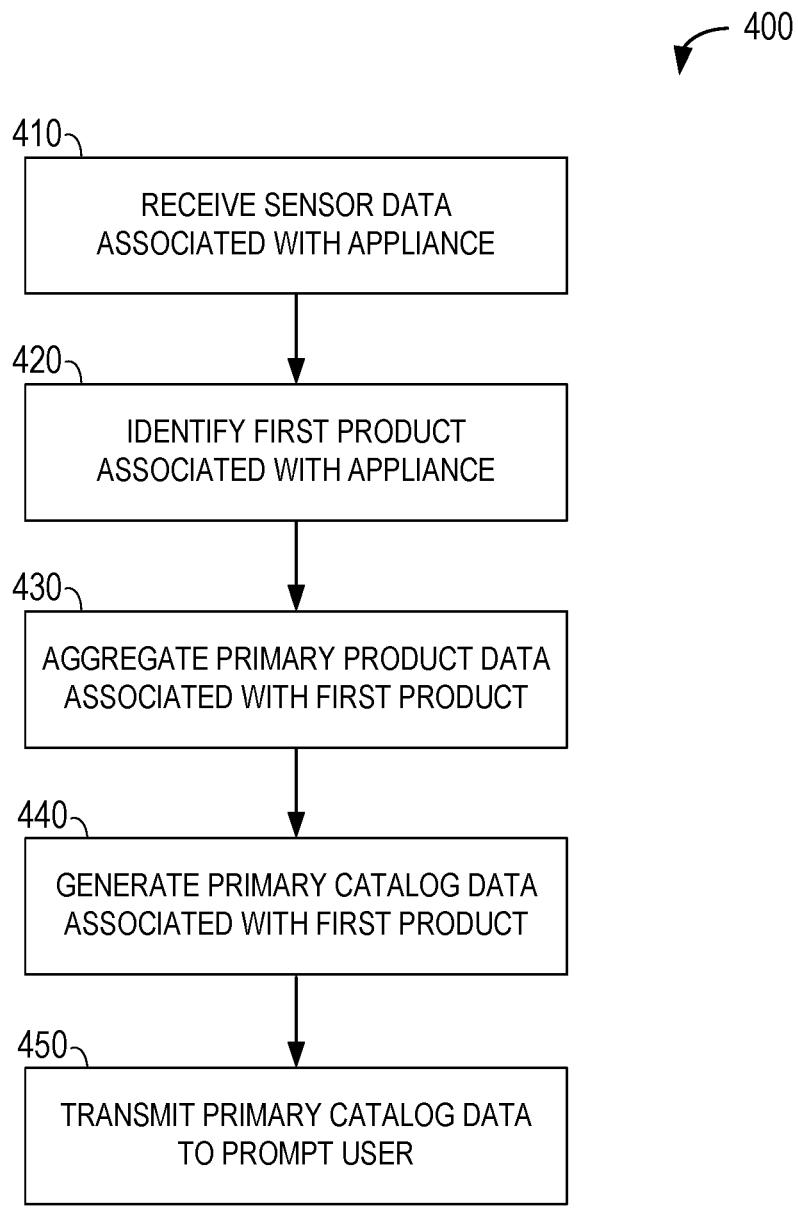
FIG. 4 is a flowchart of an example method for providing contextual user experiences using a computing system, such as the computing system shown in FIG. 3.

FIG. 4 is a flowchart illustrating an example method 400 for providing contextual user experiences using a computing system (e.g., system server 220, computing system 300). Sensor data 214 is received at operation 410 from an appliance 210 associated with a consumer 202. The computing system 300 may use a user account 230 to identify an appliance 210 associated with the consumer 202, and communicate with the identified appliance 210 to receive sensor data 214. For example, the user account 230 includes contact data 364 that may be used to identify and communicate with an appliance 210.

Additionally or alternatively, the computing system 300 may receive sensor data 214, and analyze the sensor data 214 to identify an appliance 210 associated with the received sensor data 214. For example, the sensor data 214 may be analyzed to identify a device identifier, and the device identifier may be compared with profile information 232 associated one or more accounts 228 to identify, from the accounts 228, an account 228 including profile information 232 (e.g., credential data 362, contact data 364) that corresponds to or matches the device identifier (e.g., the user account 230).

A first product associated with the appliance 210 is identified at operation 420. The computing system 300 may use the user account 230 to identify correlation data 366 associated with the appliance 210, and use the identified correlation data 366 to identify the first product. Primary product data 374 associated with the first product is aggregated at operation 430. The primary product data 374 may be received, for example, from one or more merchant devices 254 associated with one or more merchants 120. Based on the primary product data 374, primary catalog data 376 associated with the first product is generated at operation 440. In some embodiments, the primary catalog data 376 includes one or more portions associated with one or more merchant accounts 236. Each portion of the primary catalog data 376 may be associated, for example, with a respective merchant 120.

Presentation data is transmitted to a user device 252 associated with the consumer 202 at operation 450. The presentation data may include the primary catalog data 376 to prompt the consumer 202 to enter into a financial transaction associated with the first product. Each portion of the primary catalog data 376 may be selectable, for example, to facilitate a financial transaction between the consumer 202 and a respective merchant 120. In some embodiments, the presentation data includes one or more insights 222 and/or recommendation data 372.

Secondary product data 378 associated with the first product and/or a second product associated with the first product (e.g., a contextual offer) may be received or aggregated from one or more merchant devices 254 associated with one or more merchants 120. Based on the secondary product data 378, secondary catalog data 380 associated with the first product and/or second product may be generated and transmitted to the user device 252. For example, the presentation data may be generated to include the secondary catalog data 380, such that the secondary catalog data 380 is transmitted as a portion of the presentation data.

Figure 5:
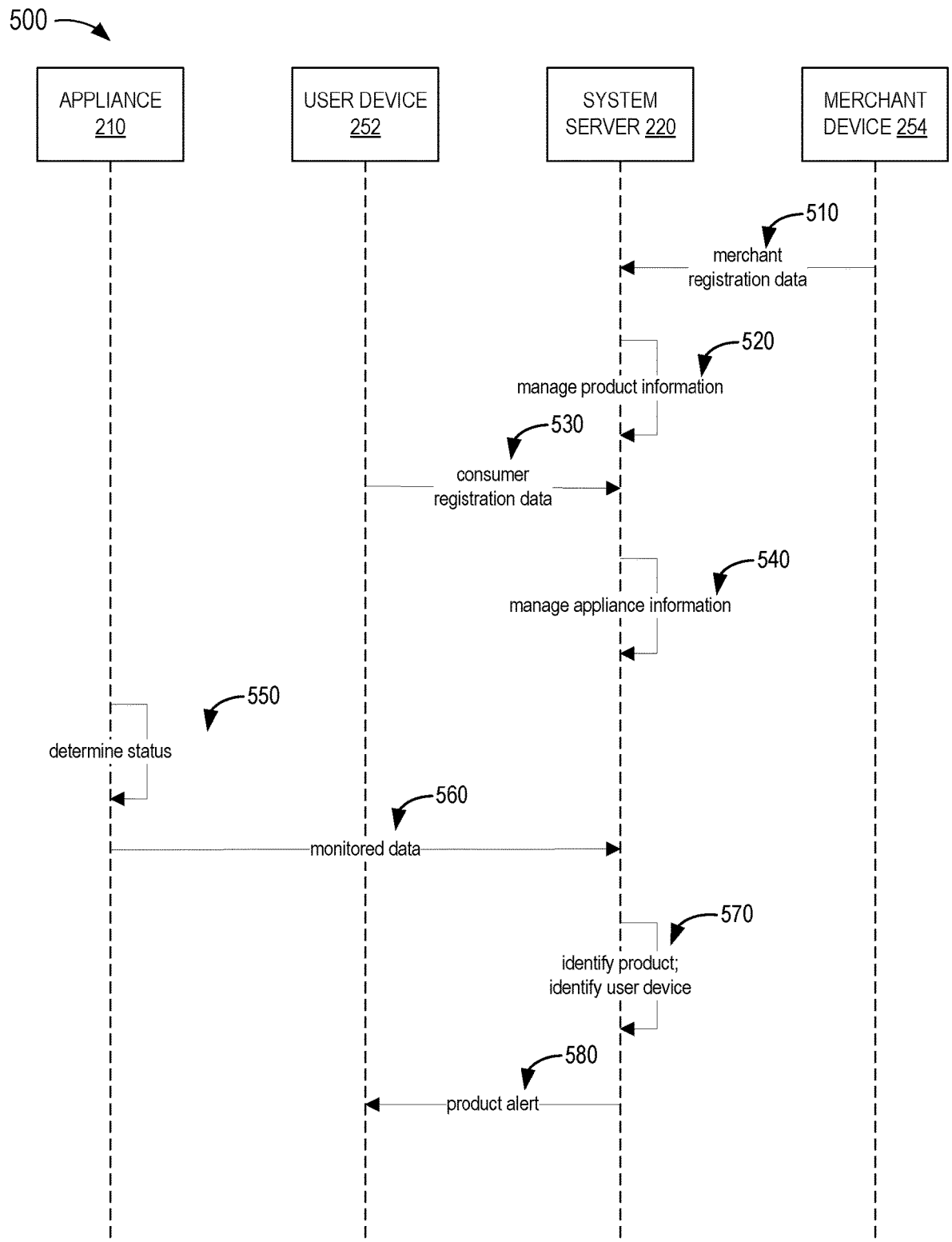
FIG. 5 is a sequence diagram of an example method for registering data and monitoring an appliance in an ecosystem, such as the ecosystem shown in FIG. 2.

FIG. 5 is a sequence diagram illustrating an example method 500 that enables contextual user experiences to be provided in the ecosystem 200. In some embodiments, a consumer 202 is associated with an appliance 210 and a user device 252, and a merchant 120 is associated with a merchant device 254. During a merchant registration phase, the merchant 120 may use the merchant device 254 to register merchant registration data at operation 510. Merchant registration data may include, for example, primary product data 374 associated with one or more first products. Upon receiving the primary product data 374, the system server 220 manages product information 240, including the primary product data 374, at operation 520. The product information 240 may be associated, for example, with a merchant account 236 associated with the merchant 120. In some embodiments, at least a portion of the merchant registration data includes one or more device identifiers associated with one or more appliances 210. Appliances 210 associated with the merchant 120 may be used, for example, to manage stock, inventory, and/or a supply chain associated with one or more first products.

During a consumer registration phase, the consumer 202 may use the user device 252 to register consumer registration data at operation 530. Consumer registration data may include, for example, correlation data 366 that correlates the appliances 210 with one or more products (e.g., first products), and threshold data 368 that establishes one or more thresholds associated with the appliances 210 and/or products. Upon receiving the correlation data 366 and/or threshold data 368, the system server 220 manages appliance information 234 associated with one or more appliances 210, including the correlation data 366 and/or threshold data 368, at operation 540. For example, the appliances 210 may be associated with a user account 230 that is associated with the consumer 202, and the products may be associated with the appliances 210. At least a portion of the consumer registration phase may be before the merchant registration phase, after the merchant registration phase, and/or concurrent with the merchant registration phase.

During a monitored phase, an appliance 210 associated with the consumer 202 may determine a status of the product associated with the appliance 210 at operation 550. In some embodiments, the appliance 210 may detect a predetermined event or occurrence, and analyze sensor data 214 to determine whether a condition of the appliance 210 and/or of the product associated with the appliance 210 (e.g., the status) satisfies a predetermined threshold. If the predetermined threshold is not satisfied (e.g., the appliance 210 is operating within a predefined alert range and/or is not operating within a predefined non-alert range), monitored data associated with the appliance 210 is transmitted to the system server 220 at operation 560. Monitored data may include, for example, any information that enables the system server 220 to manage the appliance 210 and/or determine whether to notify a consumer 202 associated with the appliance 210, such as sensor data 214 and/or status data.

Upon receiving the monitored data, the system server 220 analyzes the monitored data to identify an appliance 210 associated with the received monitored data. The monitored data may include, for example, a device identifier associated with the appliance 210. The system server 220 identifies a user account 230 associated with the appliance 210 based on the monitored data, and uses the user account 230 to identify a product associated with the appliance 210 and a user device 252 associated with the user account 230 at operation 570. The system server 220 generates a product alert associated with the product, and transmits the product alert to the user device 252 at operation 580. In this manner, a consumer 202 may be automatically notified (e.g., with a push notification) when a predetermined threshold associated with the appliance 210 and/or product is not satisfied (e.g., product age is older than a predefined age level, product quantity is lower than a predefined quantity level). In some embodiments, historical data associated with the appliance 210 and/or product is used to determine whether a predetermined threshold is satisfied. A historical rate of consumption, for example, may be used to determine whether the predetermined threshold is satisfied and/or is projected to be satisfied within a predetermined timeframe.

Figure 6:
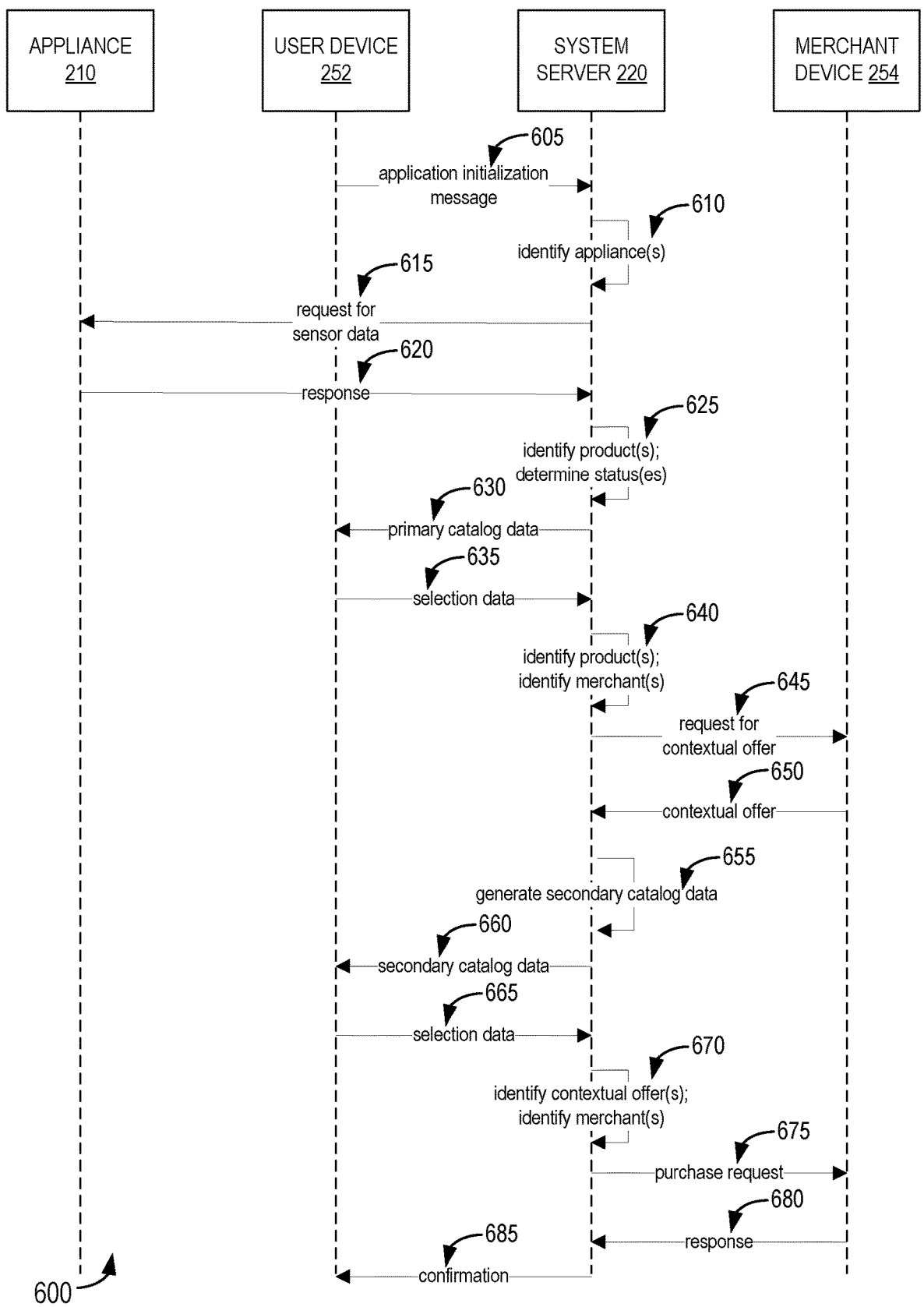
FIG. 6 is a sequence diagram of an example method for providing contextual user experiences in an ecosystem, such as the ecosystem shown in FIG. 2.

FIG. 6 is a sequence diagram illustrating an example method 600 for providing contextual user experiences in the ecosystem 200. In some embodiments, a consumer 202 is associated with an appliance 210 and a user device 252, and a merchant 120 is associated with a merchant device 254. During an application phase, the consumer 202 may use the user device 252 to use a client-side application 256. In some embodiments, the user device 252 initializes the client-side application 256, and transmits an application initialization message to the system server 220 at operation 605. Upon receiving the application initialization message, the system server 220 identifies one or more appliances 210 associated with the consumer 202 at operation 610. For example, the system server 220 may identify a user account 230 associated with the consumer 202, and use the user account 230 to identify one or more appliances 210 associated with the user account 230.

The system server 220 generates a request for sensor data 214, and transmits the request to the appliance 210 at operation 615. Upon receiving the request, the appliance 210 processes the request and transmits a response to the request at operation 620. The response may include, for example, sensor data 214 associated with the appliance 210. The system server 220 analyzes the response to identify one or more products associated with the appliance 210 (e.g., first product), and determine one or more statuses associated with the appliance 210 and/or products at operation 625. In some embodiments, the system server 220 aggregates primary product data 374 associated with the products, and uses the primary product data 374 to generate primary catalog data 376 associated with the products.

The primary catalog data 376 is transmitted to the user device 252 at operation 630 to prompt the consumer 202 to select or identify one or more products for entering into one or more financial transactions. The consumer 202 may be provided, for example, with an opportunity to compare primary catalog data 376 associated with a plurality of products from a plurality of merchants 120. Upon receiving user input indicating a selection of one or more products, the user device 252 generates selection data associated with the selection, and transmits the selection data to the system server 220 at operation 635. Upon receiving the selection data, the system server 220 identifies one or more products associated with the selection data, and identifies one or more merchants 120 associated with the products at operation 640. In some embodiments, an aggregate shopping list associated with a plurality of merchants is generated.

The system server 220 generates a request for a contextual offer, and transmits the request to one or more merchant devices 254 associated with the merchants 120 at operation 645. A merchant device 254 may process the request to identify one or more contextual offers, and generate secondary product data 378 associated with the contextual offers. In some embodiments, the system server 220 communicates with the user device 252 to identify a location of the consumer 202 and/or obtain location data associated with the consumer 202. The location data may be included in the request, for example, to enable the merchant devices 254 to identify one or more contextual offers based on the location data.

The merchant device 254 transmits the secondary product data 378 to the system server 220 at operation 650, and the system server 220 processes the secondary product data 378 to generate secondary catalog data 380 associated with the contextual offers at operation 655. The secondary catalog data 386 is transmitted to the user device 252 at operation 660 to prompt the consumer 202 to select or identify one or more contextual offers for entering into one or more financial transactions. Upon receiving user input indicating a selection of one or more contextual offers, the user device 252 generates selection data associated with the selection, and transmits the selection data to the system server 220 at operation 665. Upon receiving the selection data, the system server 220 identifies one or more contextual offers associated with the selection data, and identifies one or more merchants 120 associated with the contextual offers at operation 670.

The system server 220 generates a purchase request, and transmits the purchase request to the merchant device 254 at operation 675. The purchase request may include, for example, profile information 232, such as cardholder data 370 and/or shipping data. The merchant device 254 processes the purchase request to generate a response to the purchase request, and transmits the response to the system server 220 at operation 680. The response may be processed, for example, at the system server 220, and transmitted to the user device 252 as a confirmation of the financial transaction at operation 685. In some embodiments, the system server 220 generates a confirmation message associated with a disposition of the financial transaction. The confirmation message may be generated, for example, to notify the consumer 202 of the disposition. In some embodiments, the system server 220 processes a respective payment for each product and/or for each merchant 120. Alternatively, the system server 220 may process a single payment in exchange for one or more products and/or contextual offers associated with one or more merchants 120.

Figure 7:
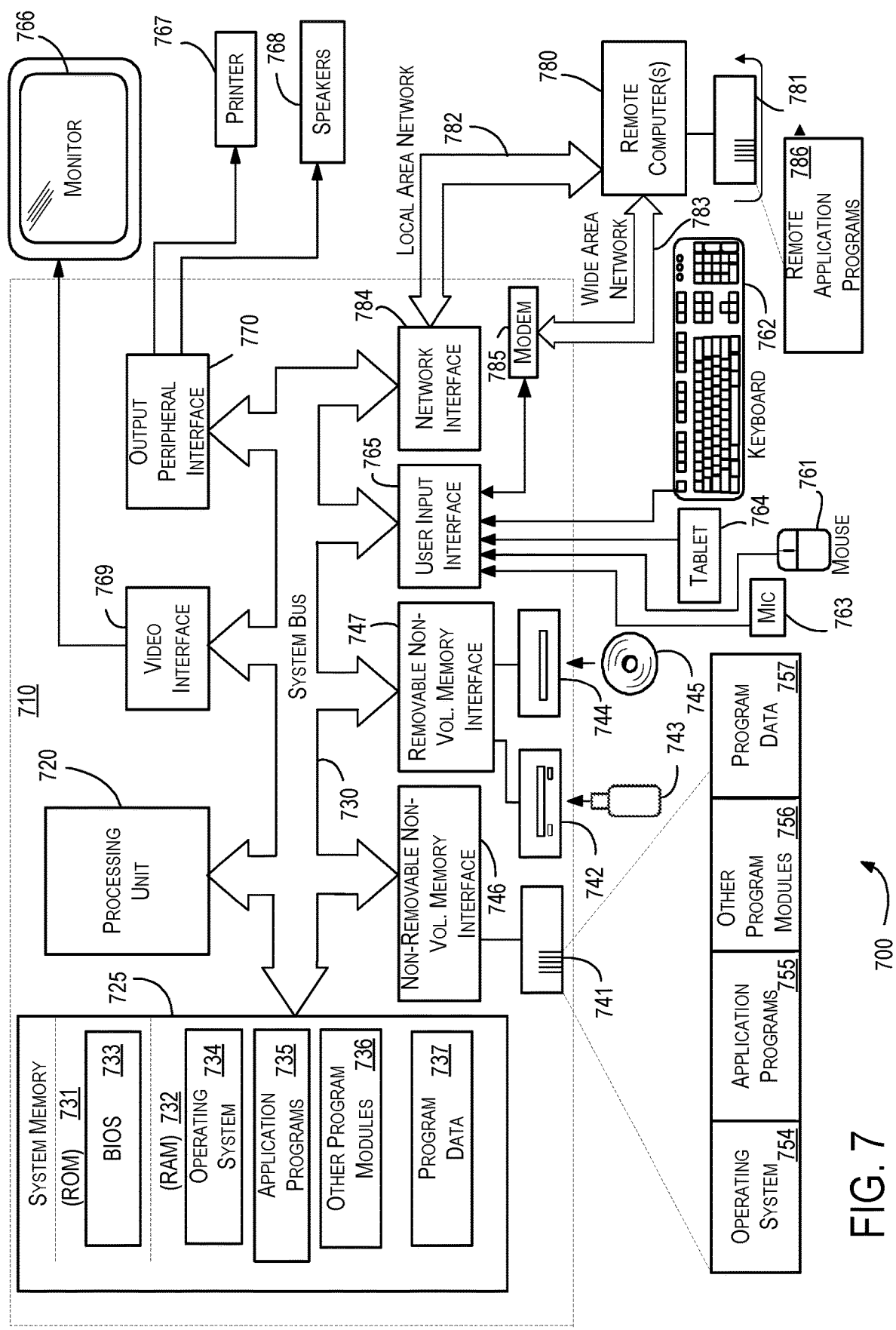
FIG. 7 is a block diagram illustrating an example operating environment in which computing operations may be performed.

FIG. 7 is a block diagram illustrating an example operating environment 700 that may be used to process one or more financial transactions, including providing contextual user experiences. The operating environment 700 is only one example of a computing and networking environment and is not intended to suggest any limitation as to the scope of use or functionality of the disclosure. The operating environment 700 should not be interpreted as having any dependency or requirement relating to any one or combination of components illustrated in the example operating environment 700.

The disclosure is operational with numerous other computing and networking environments or configurations. While some embodiments of the disclosure are illustrated and described herein with reference to the operating environment 700 being or including a system server 220 (shown in FIG. 2) and/or a computing system 300 (shown in FIG. 3), aspects of the disclosure are operable with any computing system (e.g., appliance 210, user device 252, merchant device 254, gateway 270) that executes instructions to implement the operations and functionality associated with the operating environment 700.

For example, the operating environment 700 may include a mobile device, a tablet, a laptop computer, a desktop computer, a server computer, a microprocessor-based system, a multiprocessor system, a communication devices in a wearable or accessory form factor (e.g., a watch, glasses, a headset, earphones, and the like), programmable consumer electronics, a portable media player, a gaming console, a set top box, a kiosk, a tabletop device, an industrial control device, a minicomputer, a mainframe computer, a network computer, a distributed computing environment that includes any of the above systems or devices, and the like. The operating environment 700 may represent a group of processing units or other computing systems. Additionally, any computing system described herein may be configured to perform any operation described herein including one or more operations described herein as being performed by another computing system.

With reference to FIG. 7, an example system for implementing various aspects of the disclosure may include a general purpose computing system in the form of a computer 710. Components of the computer 710 may include, but are not limited to, a processing unit 720 (e.g., a processor), a system memory 725 (e.g., a computer-readable storage device), and a system bus 730 that couples various system components including the system memory 725 to the processing unit 720. The system bus 730 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 725 includes any quantity of media associated with or accessible by the processing unit 720. For example, the system memory 725 may include computer storage media in the form of volatile and/or nonvolatile memory, such as read only memory (ROM) 731 and random access memory (RAM) 732. The ROM 731 may store a basic input/output system (BIOS) 733 that facilitates transferring information between elements within computer 710, such as during start-up. The RAM 732 may contain data and/or program modules that are immediately accessible to and/or presently being operated on by processing unit 720. For example, the system memory 725 may store computer-executable instructions, application data, transaction data, identifier data, profile data, location data, product data, linguistic data, and other data. By way of example, and not limitation, FIG. 7 illustrates operating system 734, application programs 735, other program modules 736, and program data 737.

The computer 710 includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media are tangible and mutually exclusive to communication media.

Computer storage media includes volatile and nonvolatile, removable and non-removable media implemented in any method or technology, such as semiconductor, magnetic, or optical technologies, for storage of information, such as computer-executable instructions, data structures, program modules or other data. Example computer storage media includes, but is not limited to, ROM 731, RAM 732, electrically erasable programmable read-only memory (EEPROM), solid-state memory, flash memory, a hard disk, magnetic storage, floppy disk, magnetic tape, a compact disc (CD), a digital versatile disc (DVD), a BLU-RAY DISC® brand optical disc, an ultra density optical (UDO) disc, or any other medium which may be used to store the desired information and which may be accessed by the computer 710. (BLU-RAY DISC® is a registered trademark of Blu-ray Disc Association located in Burbank, Calif.). Computer storage media are implemented in hardware and exclude carrier waves and propagated signals. Computer storage media for purposes of this disclosure are not signals per se.

Communication media typically embodies computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

By way of example only, FIG. 7 illustrates a hard disk drive 741 that reads from or writes to non-removable, nonvolatile magnetic media, a universal serial bus (USB) port 742 that reads from or writes to a removable, nonvolatile memory 743, and an optical disk drive 744 that reads from or writes to a removable, nonvolatile optical disk 745. Other removable/non-removable, volatile/nonvolatile computer storage media that may be used in the example operating environment include, but are not limited to, solid state memory, flash memory, and the like. The hard disk drive 741 may be connected to the system bus 730 through a non-removable memory interface such as interface 746, and magnetic disk drive 742 and optical disk drive 744 may be connected to the system bus 730 by a removable memory interface, such as interface 747.

The drives and their associated computer storage media, described above and illustrated in FIG. 7, provide storage of computer-executable instructions, data structures, program modules, components (e.g., interface component 310, account component 320, management component 330, catalog component 340, transaction component 350, inventory component 360), applications (e.g., server-side application 226, client-side application 256), and other data for the computer 710. In FIG. 7, for example, hard disk drive 741 is illustrated as storing operating system 754, application programs 755, other program modules 756 and program data 757. Note that these components may either be the same as or different from operating system 734, application programs 735, other program modules 736, and program data 737. Operating system 754, application programs 755, other program modules 756, and program data 757 are given different numbers herein to illustrate that, at a minimum, they are different copies.

The processing unit 720 includes any quantity of processing units, and the instructions may be performed by the processing unit 720 or by multiple processors within the operating environment 700 or performed by a processor external to the operating environment 700. The processing unit 720 may be programmed to execute the computer-executable instructions for implementing aspects of the disclosure, such as those illustrated in the figures (e.g., FIGS. 4-6). For example, the processing unit 720 may execute an interface component 310 (shown in FIG. 3), an account component 320 (shown in FIG. 3), a management component 330 (shown in FIG. 3), a catalog component 340 (shown in FIG. 3), a transaction component 350 (shown in FIG. 3), and/or an inventory component 360 (shown in FIG. 3) for implementing aspects of the disclosure.

Upon programming or execution of these components, the operating environment 700 and/or processing unit 720 is transformed into a special purpose microprocessor or machine. For example, the management component 330, when executed by the processing unit 720, causes the computer 710 to receive sensor data 214 associated with an appliance 210, and analyze the sensor data 214 to identify a product; and the catalog component 340, when executed by the processing unit 720, causes the computer 710 to identify one or more merchant accounts 236 associated with the product, use the merchant accounts 236 to aggregate primary product data 374 associated with the product, generate primary catalog data 376 associated with the product; and transmit the primary catalog data to prompt a consumer 202 to enter into a financial transaction associated with the product. Although the processing unit 720 is shown separate from the system memory 725, embodiments of the disclosure contemplate that the system memory 725 may be onboard the processing unit 720 such as in some embedded systems.

A user (e.g., consumer 202, merchant 120) may enter commands and information into the computer 710 through one or more input devices, such as a pointing device 761 (e.g., mouse, trackball, touch pad), a keyboard 762, a microphone 763, and/or an electronic digitizer 764 (e.g., on a touchscreen). Other input devices not shown in FIG. 7 may include a joystick, a game pad, a controller, a satellite dish, a camera, a scanner, an accelerometer, or the like. The computer 710 may accept input from the user in any way, including from input devices, via gesture input, via proximity input (such as by hovering), and/or via voice input. These and other input devices may be coupled to the processing unit 720 through a user input interface 765 that is coupled to the system bus 730, but may be connected by other interface and bus structures, such as a parallel port, game port or the USB port 742.

Information, such as text, images, audio, video, graphics, alerts, and the like, may be presented to a user via one or more presentation devices, such as a monitor 766, a printer 767, and/or a speaker 768. Other presentation devices not shown in FIG. 7 may include a projector, a vibrating component, or the like. These and other presentation devices may be coupled to the processing unit 720 through a video interface 769 (e.g., for a monitor 766 or a projector) and/or an output peripheral interface 770 (e.g., for a printer 767, a speaker 768, and/or a vibration component) that are coupled to the system bus 730, but may be connected by other interface and bus structures, such as a parallel port, game port or the USB port 742. In some embodiments, the presentation device is integrated with an input device configured to receive information from the user (e.g., a capacitive touch-screen panel, a controller including a vibrating component). Note that the monitor 766 and/or touch screen panel may be physically coupled to a housing in which the computer 710 is incorporated, such as in a tablet-type personal computer.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more LANs 782 and one or more WANs 783, but may also include other networks. Such networking environments are commonplace in offices, enterprise-wide computer networks, intranets and the Internet.

When used in a LAN networking environment, the computer 710 is coupled to the LAN 782 through a network interface or adapter 784. When used in a WAN networking environment, the computer 710 may include a modem 785 or other means for establishing communications over the WAN 783, such as the Internet. The modem 785, which may be internal or external, may be connected to the system bus 730 via the user input interface 765 or other appropriate mechanism. A wireless networking component including an interface and antenna may be coupled through a device, such as an access point or peer computer to a LAN 782 or WAN 783. In a networked environment, program modules depicted relative to the computer 710, or portions thereof, may be stored in the remote memory storage device. By way of example, and not limitation, FIG. 7 illustrates remote application programs 786 as residing on memory storage device 781. It may be appreciated that the network connections shown are examples and other means of establishing a communications link between the computers may be used.

The block diagram of FIG. 7 is merely illustrative of an example system that may be used in connection with one or more examples of the disclosure and is not intended to be limiting in any way. Further, peripherals or components of the computing systems known in the art are not shown, but are operable with aspects of the disclosure. At least a portion of the functionality of the various elements in FIG. 7 may be performed by other elements in FIG. 7, or an entity (e.g., processor, web service, applications, server, computing system, etc.) not shown in FIG. 7.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile devices, tablets laptop computers, desktop computers, server computers, microprocessor-based systems, multiprocessor systems, programmable consumer electronics, communication devices in wearable or accessory form factors, portable media players, gaming consoles, set top boxes, kiosks, tabletop devices, industrial control devices, minicomputers, mainframe computers, network computers, distributed computing environments that include any of the above systems or devices, and the like.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

The embodiments illustrated and described herein as well as embodiments not specifically described herein but within the scope of aspects of the disclosure constitute example means for obtaining permission using nonvisual communication to authorize one or more transactions. For example, the elements illustrated in FIGS. 1-3 and 5-7, such as when encoded to perform the operations illustrated in FIGS. 4-6, constitute at least an example means for receiving sensor data 214 associated with an appliance 120 (e.g., interface component 310, management component 330, inventory component 360); an example means for identifying a product (e.g., management component 330); an example means for aggregating primary product data 374 associated with the product (e.g., catalog component 340); an example means for generating primary catalog data 376 associated with the product (e.g., catalog component 340); and/or an example means for transmitting presentation data (e.g., interface component 310, catalog component 340, transaction component 350).

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various embodiments with their associated operations, a person skilled in the art would appreciate that a combination of operations from any number of different embodiments is also within the scope of the aspects of the disclosure.

What is claimed is:

1. A computing system for providing a contextual user experience, the computing system comprising:
    a memory device storing data associated with a plurality of accounts, and computer-executable instructions; and
    a processor configured to execute the computer-executable instructions to:
        receive, from a sensor device, sensor data associated with an appliance, the appliance associated with a first user account of the plurality of accounts;
        analyze the sensor data to identify a first product of a plurality of products;
        identify one or more second user accounts of the plurality of accounts that are associated with the identified first product;
        use the one or more second user accounts to aggregate primary product data associated with the first product;
        receive, from one or more other sensor devices, other sensor data associated with one or more other appliances, the one or more other appliances associated with the one or more second user accounts;
        use the other sensor data to modify the primary product data associated with the first product;
        based on the modified primary product data, generate primary catalog data associated with the first product, the primary catalog data including one or more portions associated with the one or more second user accounts; and
        transmit, to a client device associated with the first user account, presentation data including the primary catalog data to prompt a first user associated with the first user account to enter into a transaction associated with the first product, each portion of the one or more portions selectable to facilitate the transaction between the first user and a respective second user associated with the one or more second user accounts.

2. The computing system of claim 1, wherein the processor is further configured to execute the computer-executable instructions to receive, from one or more other client devices, registration data associated with the plurality of products, the one or more other client devices associated with the one or more second user accounts, the registration data including the primary product data.

3. The computing system of claim 1, wherein the processor is further configured to execute the computer-executable instructions to receive, from the client device, registration data including correlation data that correlates the appliance with the first product, threshold data associated with a threshold of the first product, and cardholder data associated with the first user, the cardholder data usable to enter into the transaction associated with the first product.

4. The computing system of claim 1, wherein the processor is further configured to execute the computer-executable instructions to analyze the sensor data to determine a status of the first product, the appliance associated with one or more of the first product and a second product of the plurality of products that is associated with the first product.

5. The computing system of claim 1, wherein the processor is further configured to execute the computer-executable instructions to analyze the sensor data and historical data associated with the first product to determine a status of the first product.

6. The computing system of claim 1, wherein the processor is further configured to execute the computer-executable instructions to:
    analyze the sensor data to determine a status of the first product; and
    based on the determined status, generate recommendation data associated with the first product, the presentation data including the recommendation data such that the recommendation data is transmitted to the client device.

7. The computing system of claim 1, wherein the processor is further configured to execute the computer-executable instructions to:
    transmit, to one or more other client devices, a request for contextual offers, the one or more other client devices associated with the one or more second user accounts;
    receive, from the one or more other client devices, one or more responses to the request for contextual offers, the one or more responses including secondary product data associated with one or more of the first product and a second product of the plurality of products that is associated with the first product; and based on the secondary product data, generate secondary catalog data associated with the one or more of the first product and the second product, the presentation data including the secondary catalog data such that the secondary catalog data is transmitted to the client device.

8. The computing system of claim 1, wherein the processor is further configured to execute the computer-executable instructions to:

receive, from the client device, location data associated with the first user;

generate a request for contextual offers, the request including the location data;

transmit, to one or more other client devices, the request for contextual offers, the one or more other client devices associated with the one or more second user accounts;

receive, from the one or more other client devices, one or more responses to the request for contextual offers, the one or more responses including secondary product data; and based on the secondary product data, generate secondary catalog data, the presentation data including the secondary catalog data such that the secondary catalog data is transmitted to the client device.

9. The computing system of claim 1, wherein the processor is further configured to execute the computer-executable instructions to:

categorize the first product based on a risk of depletion; and based on the risk of depletion, automatically enter the first user associated with the first user account into the transaction associated with the first product.

10. One or more computer storage media embodied with computer-executable instructions, the one or more computer storage media comprising:

a management component that, upon execution by at least one processor, obtains sensor data associated with an appliance, and analyzes the sensor data to identify a first product of a plurality of products, the appliance associated with a first user;

an inventory component that, upon execution by the at least one processor, obtains other sensor data associated with one or more other appliances and manages primary product data associated with the first product using the other sensor data, the one or more other appliances associated with one or more second users; and a catalog component that, upon execution by the at least one processor, aggregates primary product data associated with the first product, and uses the primary product data to generate primary catalog data that includes one or more portions corresponding to the one or more second users associated with the first product; and a transaction component that, upon execution by the at least one processor, prompts the first user to select a portion of the one or more portions for entering into a transaction associated with the first product with a corresponding second user.

11. The one or more computer storage media of claim 10, further comprising an account component configured to obtain registration data associated with the one or more second users, the registration data including the primary product data.

12. The one or more computer storage media of claim 10, further comprising an account component configured to obtain registration data associated with the first user, the registration data including correlation data that correlates the appliance with the first product, threshold data associated with a threshold of the first product, and cardholder data usable to enter into the transaction associated with the first product.

13. The one or more computer storage media of claim 10, wherein the management component is configured to:

analyze the sensor data and historical data associated with the first product to determine a status of the first product; and generate recommendation data associated with the first product.

14. The one or more computer storage media of claim 10, wherein the management component is configured to:

categorize the first product based on a risk of depletion; and based on the risk of depletion associated with the first product, automatically enter into the transaction between the first user and the corresponding second user.

15. The one or more computer storage media of claim 10, wherein the management component is configured to recommend a purchase quantity for the first product based on price data.

16. A computer-implemented method for providing a contextual user experience, the computer-implemented method comprising:

receiving, from a sensor device, sensor data associated with an appliance, the appliance associated with a first user account, the first user account associated with a first user;

based on the sensor data, identifying a first product of a plurality of products;

aggregating primary product data associated with the first product;

receiving, from one or more other sensor devices, other sensor data associated with one or more other appliances, the one or more other appliances associated with one or more second user accounts;

use the other sensor data to modify the primary product data associated with the first product;

based on the modified primary product data, generating primary catalog data associated with the first product, the primary catalog data including one or more portions associated with the one or more second user accounts; and transmitting, to a client device associated with the first user account, presentation data including the primary catalog data to prompt the first user to enter into a transaction associated with the first product, each portion of the one or more portions selectable to facilitate the transaction between the first user and a respective second user associated with the one or more second user accounts.

17. The computer-implemented method of claim 16, further comprising:

analyzing the sensor data to identify one or more insights associated with the first user;

using the one or more insights to generate one or more instructions; and transmit the one or more instructions to the appliance to perform one or more operations in accordance with the one or more instructions.

18. The computer-implemented method of claim 16, further comprising receiving, from the client device, correlation data that correlates the appliance with the first product, threshold data associated with a threshold of the first product, and cardholder data associated with the first user, the cardholder data usable to enter into the transaction associated with the first product.

19. The computer-implemented method of claim 16, further comprising:
   analyzing the sensor data and historical data associated with the first product to determine a status of the first product, the appliance associated with one or more of the first product and a second product of the plurality of products that is associated with the first product; and
   based on the determined status, generating recommendation data associated with the first product; and
   transmitting, to the client device, the recommendation data.

20. The computer-implemented method of claim 16, further comprising:
   receiving, from one or more other client devices, secondary product data associated with one or more of the first product and a second product of the plurality of products that is associated with the first product, the one or more other client devices associated with the one or more second user accounts;
   based on the secondary product data, generating secondary catalog data associated with the one or more of the first product and the second product, the presentation data including the secondary catalog data such that the secondary catalog data is transmitted to the client device; and
   transmitting, to the client device, the secondary catalog data.

* * * * *